C. A. FISCHER.
Molds for Forming Clay Articles.
No. 140,910. Patented July 15, 1873.
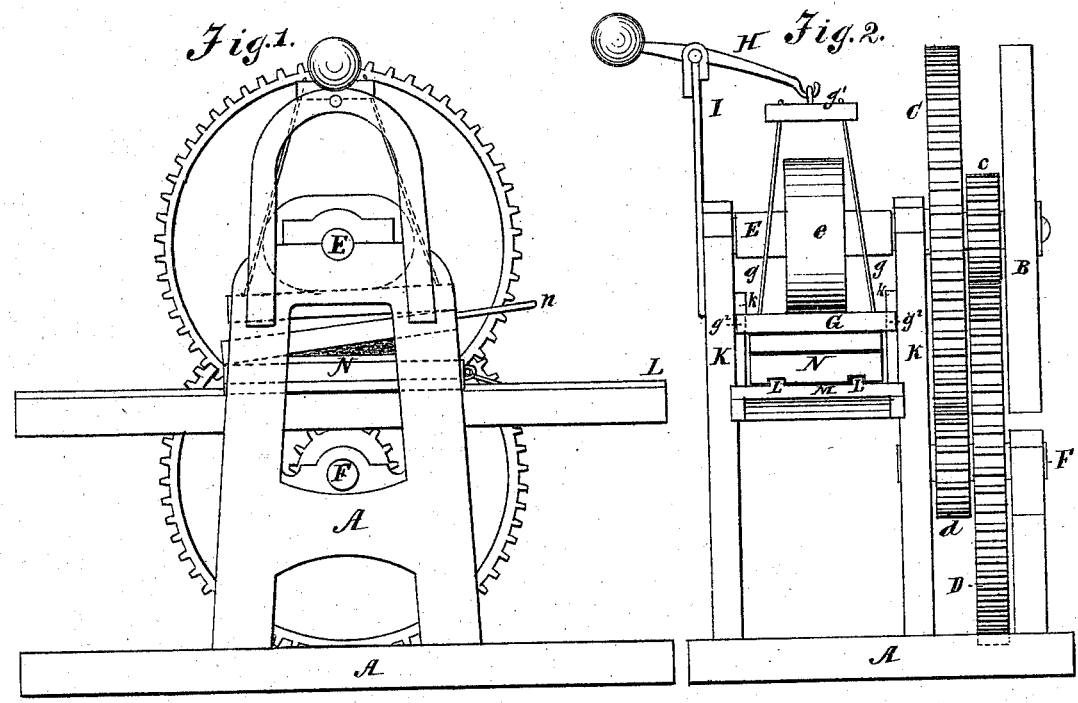
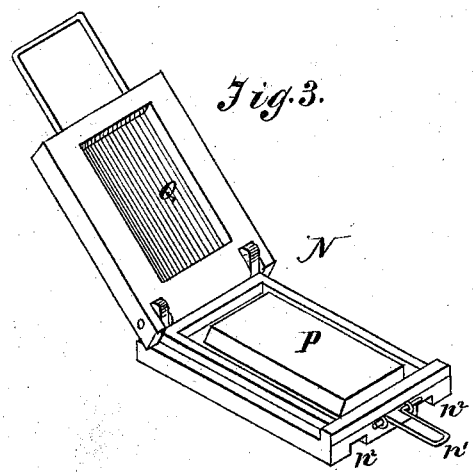
Witnesses:
G. Mathys
Gylon C. Kemon
Inventor:
Charles A. Fischer
per [signature]
Attorneys.

UNITED STATES PATENT OFFICE.

CHARLES A. FISCHER, OF BALTIMORE, MARYLAND.

IMPROVEMENT IN MOLDS FOR FORMING CLAY ARTICLES.

Specification forming part of Letters Patent No. 140,910, dated July 15, 1873; application filed May 9, 1873.

*To all whom it may concern:*

Be it known that I, CHARLES A. FISCHER, of the city of Baltimore and State of Maryland, have invented a new and Improved Clay-Molding Machine; and I do hereby declare the following to be a full, clear, and exact description of the same, reference being had to the accompanying drawing forming part of this specification, in which—

Figure 1 is a side elevation of a press for use with the mold; Fig. 2, an end view; and Fig. 3 a perspective of the open mold.

The invention consists in an improved construction of the mold for shaping clay into any desired form, as hereinafter described and claimed.

N is a mold, formed of two parts hinged together at one end, and provided, respectively, with the pieces $n$ $n^1$, the former of which is hinged and turns up to receive a pin between them. On the outside of this mold are grooves $n^2$ $n^2$ to enable it to fit on rails, and on the inside of this mold and in the bottom thereof is a die, P, or engraving-plate, on which is cut or raised some name, words, or design, while around this is formed a channel, $p$, to receive the excised portions of clay. This is scraped out or removed in any suitable way. In the top of mold is a space, Q, shaped to correspond to the desired form of the clay-plate.

The operation of the mold and machine is as follows: The pliable clay is inserted into and made to fill the space Q when the two parts of the mold are shut together, placed on rails, and slid under a follower. The latter is then forced down by a superincumbent cam, which is actuated by any suitable multiplying-gear, whereby great power is obtained by a corresponding loss of velocity. The clay plates thus firmly compressed into the shape desired, are dried, and burnt in a kiln.

Having thus described my invention, what I claim as new, and desire to secure by Letters Patent, is—

The two-part mold N having die P with its circumjacent channel $p$ and clay-space Q in cover, applicable as and for the purpose described.

CHARLES A. FISCHER.

Witnesses:
 MARTIN KRATT,
 JOHN SCHROEDER.